United States Patent [19]

Daude et al.

[11] Patent Number: 5,116,442
[45] Date of Patent: May 26, 1992

[54] PROCESS FOR PRODUCING A TRANSPARENT POLYURETHANE FILM WITH ENERGY-ABSORBING AND ANTIFOGGING PROPERTIES

[75] Inventors: Gérard M. Daude, Villenave; D'Ornon; Jean-Louis M. Bravet, Thourotte, both of France

[73] Assignee: Saint-Gobain Vitrage, Aubervilliers, France

[21] Appl. No.: 620,197

[22] Filed: Nov. 30, 1990

Related U.S. Application Data

[63] Continuation of Ser. No. 354,759, May 22, 1989, Pat. No. 4,983,461.

[30] Foreign Application Priority Data

May 20, 1988 [FR] France .................. 88 06779

[51] Int. Cl.⁵ .................. B05D 1/02; B32B 27/40; B32B 17/10
[52] U.S. Cl. .................. 156/99; 156/280; 427/163; 427/164; 427/165; 427/407.1; 427/407.2
[58] Field of Search .................. 264/171, 129, 216; 427/161, 165, 169, 389.7, 407.2, 407.1, 163, 164; 156/99, 280

[56] References Cited

U.S. PATENT DOCUMENTS

| | | | |
|---|---|---|---|
| 3,935,367 | 1/1976 | Merrill et al. | 427/162 |
| 4,039,720 | 8/1977 | Cherenko et al. | 427/54.1 |
| 4,784,916 | 11/1988 | Bravet | 427/407.2 |
| 4,818,622 | 4/1989 | Bravet et al. | 427/389.7 |
| 4,830,806 | 5/1989 | Daude et al. | 264/216 |
| 4,983,461 | 1/1991 | Daude et al. | 427/163 |

*Primary Examiner*—James Lowe
*Attorney, Agent, or Firm*—Oblon, Spivak, McClelland, Maier & Neustadt

[57] ABSTRACT

A polyurethane film of excellent optical quality is prepared by applying to a substrate, by reactive casting or reactive spraying, a reaction mixture of an isocyanate component and a polyol component containing at least one long difunctional polyol having a molecular weight between 500 and 10,000, containing at least partial ethylene oxide segments, with the percentage by weight of ethylene oxide segments relative to the total weight of the polyurethane being greater than 20%, at least one short diol as chain extender, with the ratio of free NCO groups of the isocyanate component to free OH groups of the polyol component being between 1.5 and 2; and contacting a surface of said applied material intended to face toward the outside of the safety glass with a surface treatment compound of an acrylic derivative or isocyanate having a functionality greater than 2.

14 Claims, No Drawings

PROCESS FOR PRODUCING A TRANSPARENT POLYURETHANE FILM WITH ENERGY-ABSORBING AND ANTIFOGGING PROPERTIES

This is a continuation of application Ser. No. 07/354,759, filed on May 22, 1989, now U.S. Pat. No. 4,893,461.

BACKGROUND OF THE INVENTION

1. Field of the Invention:

The present invention relates to a polyurethane film of high optical quality with energy-absorbing properties, scratch resistance and abrasion resistance, and antifogging properties, that can be used as an external film in safety windows, especially windshields.

2. Description of the Background:

European Pat. 0 133 090 discloses a polyurethane film formed in a continuous process by reactive casting of a reaction mixture of the components of a polyurethane on a flat, horizontal support from which it can be detached. Reactive casting in this technical field means casting to form a film from a liquid mixture of components in the state of monomers or prepolymers, followed by polymerization of this mixture by heat. The reaction mixture described in the patent includes an active hydrogen component, specifically a polyol component, and an isocyanate component containing at least one aliphatic or cycloaliphatic diisocyanate or a diisocyanate prepolymer, with this component having a viscosity below approximately 5000 centipoises at +40° C. The polyol component contains at least one long difunctional polyol with a molecular weight between 500 and 4000, at least one short diol as a chain extender, and in some cases a small proportion of at least one polyol having a functionality greater than 2, especially aliphatic triols. The proportions of the long polyol, the short diol, and possibly the polyol with functionality greater than 2, are generally chosen so that for one hydroxyl equivalent, the long polyol represents about 0.30 to 0.45 equivalent, the short diol about 0.2 to 0.7 equivalent, and the polyol having a functionality greater than 2, about 0 to 0.35 equivalent. Under these conditions, the film produced has the following mechanical characteristics, measured according to AFNOR/NFT standards 46 002, 51 034, and 54 108.

i) a yield stress $\sigma_y$ at $-20°$ C. less than or equal to 3 daN/m$^{-2}$ ii) a breaking stress $\sigma_R$ at $+40°$ C. greater than or equal to 2 daN/mm$^2$.

iii) an ultimate elongation $\epsilon_R$ at $+20°$ C. between 250 and 500%, iv) a tear propagation strength Ra at $+20°$ C. greater than or equal to 9 daN/mm of thickness.

The film product of the patent also has energy-absorbing properties, as mentioned above, and scratch and abrasion resistance that make it suitable for use as an external film under some conditions. Thus, it has scratch resistance above 20 grams and abrasion resistance with blurring differential below 4%, with these values being measured by the tests described in the cited publication.

However, under severe conditions of use, for example when the film is used externally in automobile windows, where it is subjected to attack from a variety of sources and in particular attack from certain cleaning products containing strong organic solvents, the film is not entirely satisfactory, since its resistance to these products is inadequate. Furthermore, the polyurethane films mentioned above, when combined with a glass or plastic support and placed under conditions of high humidity, may become covered with fog rapidly, like glass windows, which hinders vision through the window. A need therefore continues to exist for a polyurethane film of good optical qualities and stability properties.

SUMMARY OF THE INVENTION

Accordingly, one object of the present invention is to provide a transparent polyurethane film of high optical quality that can be used as an external film in safety glass, with energy-absorbing properties, surface properties such as scratch resistance and abrasion resistance, and improved antifogging properties.

Briefly, this object and other objects of the present invention as hereinafter will become more readily apparent can be attained by a process of preparing a polyurethane film by depositing, on a support, by reactive casting or reactive spraying, a reaction mixture of an isocyanate component containing at least one aliphatic or cycloaliphatic diisocyanate or a diisocyanate prepolymer, with this component having a viscosity below about 5000 centipoises at $+40°$ C., and a polyol component including at least one long difunctional polyol having a molecular weight between 500 and 10,000, and preferably between 1000 and 3000, partially containing segments of ethylene oxide, and possibly propylene oxide, with the percentage by weight of ethylene oxide segments relative to the total weight of the polyurethane being equal to at least 20%, at least one short diol as chain extender, and possibly a small proportion of at least one polyol having a functionality greater than 2, with the OH ratio of the free NCO groups of the isocyanate component to the free OH groups of the polyol component being between 1.5 and 2, and with the surface intended to face the outside of the pane being treated by placing it in contact with a surface-treatment compound selected from the group of acrylic and isocyanate derivatives having a functionality greater than 2.

DETAILED DESCRIPTION OF THE PREFERRED EMBODIMENTS

In one embodiment of the present invention, the polyurethane film is placed in contact with the surface treatment compound when the film is prepared from its reaction mixture. For this purpose, the reaction mixture is cast or sprayed onto a substrate, which has previously been coated with a thin layer of an acrylic derivative or an isocyanate having a functionality greater than 2. After polymerization of the film, the film is removed from the supporting substrate, and on its face that was in contact with the support, it has a covering of an acrylic polymer or the polymer based on the isocyanate having a functionality greater than 2.

An embodiment for producing the film of the present invention accordingly consists of forming, on a substrate, especially a flat, horizontal substrate that is previously coated with a parting agent, a thin coating of acrylic monomers or prepolymers, or acrylic monomers that have free hydroxyl groups, or isocyanates having a functionality greater than 2, and then applying the reaction mixture of components suitable for forming the polyurethane layer on the aforesaid coating. The film is subjected to polymerization during which polymerization of the acrylates or isocyanates occurs, as well as polymerization of the monomers of the polyurethane layer, in the presence of a polymerization initiator in the case of acrylates, and then the polyurethane film is removed from the support whose surface is provided with the acrylic polymer or the polymer formed from the isocyanate having a functionality greater than 2.

The acrylic monomers and/or prepolymers which are cast onto the support as thin coated layer are selected specifically from among the acrylates and methacrylates, polyacrylates and polymethacrylates of low molecular weight, for example isobutyl meth-acrylate, dipropylene glycol diacrylate, triethylene glycol diacrylate, 1,6-hexanediol diacrylate, 1,4-butanediol diacrylate, and the like.

When the coating is formed from acrylic polymers having free hydroxyl groups, methacrylate resins are selected such as methacrylate, which have a hydroxyl number below 100. When methacrylate resins having a hydroxyl number above 100 are used, hard surfaces are obtained which ar chemically resistant but can be scratched. The hydroxyl number is the quantity of potassium in mg necessary to neutralize the free hydroxyl groups of 1 g of substance.

A viscous acrylic derivative is preferably chosen to cast onto the support because it has no tendency to be repelled from the substrate during the casting of the reaction mixture.

For initiation of thermal polymerization of the acrylate layer, an initiator such as, for example, benzoyl peroxide, an alkyl perbenzoate, azobisiso-butyronitrile, or the like is employed. The initiator is employed in an amount of about 0.5 to 5% by weight of the acrylic compound.

The initial thin film or coated layer is preferably formed on a flat, horizontal substrate by depositing a solution of the acrylic monomers and/or prepolymers, or of acrylic polymers having free hydroxyl groups onto the surface, followed by evaporation of the solvent.

Suitable solvents, for example, include simple hydrocarbons, halogenated hydrocarbons, ketones, and the like.

When the surfaces of the supporting substrate is initially coated with an isocyanate having a functionality greater than 2, a triisocyanate is preferably used, such as an biuret isocyanate or a triisocyanurate, or an isocyanate trimer, for example a biuret, an isocyanurate, or the trimer of hexa-methylenediisocyanate. A viscous isocyanate derivative is also preferably selected here.

The components from which the polyurethane film of the present invention having antifogging properties is provided are as follows:

Suitable diisocyanates employed in the present process include aliphatic difunctional isocyanates such as hexamethylenediisocyanate (HMDI), 2,2,4-trimethyl-1,6-hexanediisocyanate (TMDI), bis-4-isocyanatocyclohexylmethane (Hylene W), bis-3-methyl-4-isocyanatocyclohexylmethane, 2,2-bis-(4-isocyanatocyclohexyl)propane, 3-isocyanatomethyl-3,5,5-trimethylcyclohexylisocyanate (IPDI), m-xylylenediisocyanate (XDI), m- and p-tetra-methylxylylenediisocyanate (m- and p-TMXDI), cis- and trans-cyclohexane-1,4-diisocyanate (CHDI), 1,3-(diiso-cyanatomethyl) cyclohexane (hydrogenated XDI), and the like.

An isocyanate component containing urea functional groups can be used. The urea functional groups improve certain mechanical properties of the film. The amount of the urea groups is up to about 10% of the total weight of the isocyanate component containing the urea functional groups. The amount of the urea groups is preferably about 5 and 7% of the total weight of the aforesaid component. For the reason stated above, 3-isocyanatomethyl-3,5,5-trimethylcyclohexyldiisocyanate containing urea functional groups is preferably used (IPDI and derivatives).

The long polyol containing ethylene oxide segments and possibly propylene oxide segments can be a polyol having a molecular weight between 500 and 10,000. The ethylene oxide segment content is generally greater than 40% by weight to satisfy the condition stated above, i.e., to form a polyurethane having an ethylene oxide segment content of at least 20% by weight. Suitable polyols, for example, include polyols marketed under the name SYNPERONIC by the ICI Co., polyglycols having ethylene oxide segments marketed by the HOESCHT Co., for example the product P 41-300 having a molecular weight of about 5000, which has 80% by weight of ethylene oxide segments.

The polyols preferred for obtaining the desired mechanical properties are those having a molecular weight between 1000 and 3000. When the molecular weight is above 3000, it is usually necessary to use a higher NCO-/OH ratio to preserve satisfactory mechanical properties.

The long polyol containing ethylene oxide segments and propylene oxide segments that may be present include sulfonated polyetherpolyols, in particular a polyoxyalkylene ether of the formula:

$$R_1CH_2O-(C_2H_4O-)_n(C_3H_6O-)_mCH_2CH-R_3-CH_2-SO_3X$$

wherein

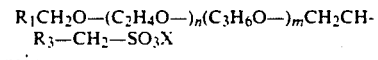

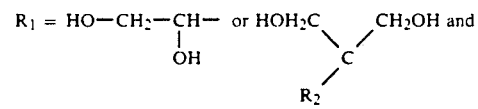

wherein
$R_2 = CH_3, C_2H_5, C_3H_7$
$R_3 = H, CH_3$.
$X = H$, alkali metal or ammonium ion
$n = 0$ to 100
$m = 0$ to 30
$N = m \geq 1$, which has a molecular weight of about 500 to 10,000.

Suitable chain extenders which can be employed include short diols having a molecular weight below about 300, and preferably below 150, such as ethylene glycol, 1,2-propanediol, 1,3-propanediol, 1,2-, 1,3-, 1,4-butanediol, 2,2-dimethyl-1,3-propanediol (neopentyl glycol), 1,5-pentanediol, 1,6-hexanediol, 1,8-octanediol, 1,10-decanediol, 1,12-dodecanediol, cyclohexanedimethanol, bisphenol A, 2-methylpentane-2,4-diol, 3-methylpentane-2,4-diol, 2-ethylhexane-1,3-diol, 2,2,4-trimethylpentane-1,3-diol, diethylene glycol, triethylene glycol, tetraethylene glycol, 2-butyne-1,4-diol, 1,4-butenediol, and substituted and/or etherified decynediol, hydroquinone bis-hydroxyethyl ether, bisphenol A etherified with two or four propylene oxide groups, or dimethylolpropionic acid. In general, the shorter the diol, the harder the film. A prepared chain extender is 1,4-butanediol, which is a good compromise for obtaining a film that is neither too hard nor too flexible.

The polyol component may contain a small amount of at least one polyol having a functionality greater than 2, and specifically monomeric aliphatic triols such as glycerine, trimethylolpropane, triols having polyether chains, and polycaprolactone triols. The molecular weight of these triols generally ranges from 90 to 1000 with the mixed polyether/polyester polyols having a functionality greater than 2, for example a functionality of 2 or 3. The addition of a polyol having a functionality greater than 2 produces supplementary bridging bonds betwee the chains of the polyurethane and can therefore further increase the cohesion of the film. Preferably used is a polyol having a functionality greater than 2, which has hydrophilic character.

The amounts of the long polyol, the short diol, and possibly the polyol having a functionality greater than 2 can vary, depending on the desired properties. Proportions are generally chosen so that for one hydroxyl equivalent, the long polyol represents about 0.30 to 0.45 equivalent, the short diol about 0.2 to 0.7 equivalent, and the polyol having a functionality greater than 2, about 0 to 0.35 equivalent.

The film can also be made by replacing a portion of the polyol component with a different active hydrogen containing compound such as an amine.

According to an embodiment of the film of plastic material, the isocyanate component may contain at least one triisocyanate such as a biuret isocyanate or a triisocyanurate, in limited proportions, for example below about 15% in NCO equivalent.

The components are used in such a quantity that the ratio of the free NCO groups of the isocyanate component to the free OH groups of the polyol component varies between 1.5 and 2, and preferably between 1.7 and 1.9. When the NCO/OH ratio is below 1.5, the mechanical properties of the film formed are unsatisfactory. When the NCO/OH ratio is greater than 2, the large excess of NCO may cause toxicity problems, and also the cost of the film is higher. A ratio between 1.7 and 1.9 is a good compromise for obtaining the desired film.

In an embodiment of the invention, the polyurethane film having the desired properties is obtained in two steps, the first step of which consists of forming the polyurethane film on a substrate, and after formation of the film, separating the film from the substrate and combining the film with a substrate such as a pane of glass to make a window. The second step consists of "treating" the free face with the surface treating agent which is the acrylic or isocyanate, by soaking the film in a bath of a solution of the aforesaid acrylic treatment compound or an isocyanate having a functionality greater than 2, especially a triisocyanate, followed by draining and polymerization of the acrylic compound or isocyanate compound. Having generally described this invention, a further understanding can be obtained by reference to certain specific examples which are provided herein for purposes of illustration only and are not intended to be limiting unless otherwise specified.

EXAMPLE 1

On a glass substrate moving continuously, which is coated with a parting agent that is a modified addition product of ethylene oxide, a solution of the following composition is applied, using a roller:
 1000 parts of hexanediol diacrylate
 1500 parts of acetone
 25 parts of azobisisobutyronitrile as initiator for the thermal polymerization of the acrylic monomers.

The coating is dried for about 2 minutes, and a film approximately 2 microns thick is obtained.

To make the polyurethane film, a polyol component is prepared first by mixing a long polyol, which is a copolymer containing ethylene oxide segments, in an amount of 57% by weight, and propylene oxide segments, having a molecular weight of 1900 (for example, the product marketed under the name SYNPERONIC L35 by the ICI Co.), with 1,4-butanediol and a polyol having a functionality greater than 2 (for example a triol marketed under the name Desmophen 1100 by the BAYER Co.). The amounts of the constituents are such that the polyol copolymer provides 0.35 equivalent of hydroxyl groups while the 1,4-butanediol provides 0.50 equivalent, and the polyol having a functionality greater than 2 supplies 0.15 equivalent.

A stabilizer is incorporated in the polyol component in an amount of 0.5% by weight of the total weight of the polyol component and of the isocyanate component, a leveling agent in an amount of 0.05% by weight calculated in the same way, and a catalyst, i.e., dibutyltin dilaurate, in an amount of 0.03% by weight calculated in the same way as above.

The isocyanate component employed is 3-isocyanatomethyl-3,5,5-trimethylcyclohexylisocyanate (IPDI) containing urea functional groups which is obtained by partial hydrolysis of IPDI and which has an NCO group content of about 31.5% by weight.

The components are used in such quantities that the NCO/OH ratio is 1.8.

After degassing the components under vacuum, the mixture, brought to about 40° C., is cast using a casting head such as that described in French Pat. No. 2 347 170, on the acrylic film previously formed. A film approximately 0.70 mm thick is thus formed, which is subjected to a polymerization cycle consisting of 2 hours of heating at about 120° C. Polymerization of the hexanediol diacrylate also occurs during this cycle, to form an acrylic polymer. The polyurethane film which carries the acrylic coating is then removed from the substrate.

The sheet obtained can be combined with an annealed or tempered pane of glass to form safety glass, with the assembly being done by arranging the face of the polyurethane film coated with the acrylic coating on the outside relative to the pane of glass.

The sheet obtained and the window prepared from the sheet subjected to the tests described below.

EXAMPLE 2

The procedure of Example 1 was repeated except that the hexanediol diacrylate is replaced by butanediol diacrylate in the acrylic composition, while used in the same amount. The sheet of plastic material obtained after polymerization detaches easily from the casting substrate.

EXAMPLE 3

A roller is used to apply to a continuously moving glass substrate coated with a release agent that is a modified addition product of ethylene oxide, a 10% solution in methyl ethyl ketone of a methacrylic resin (methacrylate) having a hydroxyl number $I_{OH}$ of 50 and a dry extract of 60% in a mixture of 4 parts of xylene and 1 part of butyl acetate (methacrylic resin marketed under the name DEGALAN VPLS 50 by the German DEGUSSA Co.). The solution applied contains azobisisobutyro-nitrile in an amount of 2.5% by weight of the dry extract of the resin, as thermal initiator.

The film is dried at 120° C. for 20 minutes, and a film about 1 micron thick is obtained.

The subsequent procedure employed is the same as described in Example 1 to form the polyurethane film on the acrylic coating.

EXAMPLE 4

The procedure of Example 3 was repeated except that the methacrylic resin having a hydroxyl number $I_{OH}$ of 50 is replaced by a methacrylic resin having a hydroxyl number Ihd OH of 73, for example the resin marketed under the name DEGALAN VPLS 73 by the DEGUSSA Co.).

EXAMPLES 5 TO 8

The procedure of Examples 1 to 4 was repeated except that the ratio of the polyols of the polyol component is modified respectively to 0.35, 0.45, and 0.20 equivalent OH for the polyol containing ethylene oxide and propylene oxide segments, 1,4-butanediol, and the polyol having a functionality greater than 2, which is a polycaprolactonetriol (for example, the product marketed under the name NIAX 301 manufactured by the UNION CARBIDE Co.).

EXAMPLES 9 AND 10

The procedure of Example 1 was repeated except that the NCO/OH ratio is modified, using respectively an NCO/OH ratio equal to 1.5 and 2.0.

EXAMPLE 11

The procedure of Example 1 is repeated except that a triisocyanate coating 2 microns thick (for example, the product marketed under the name TOLONGATE HDT by the RHONE-POULENC Co.) is cast onto the substrate instead of the acrylic coating.

EXAMPLE 12

The procedure of Example 1 is repeated to form the polyurethane film, except that the reaction mixture of components is cast directly on the casting substrate coated with the release agent, without an acrylic coating layer having previously been coated thereon. After polymerization, the polyurethane film is detached from the substrate and is assembled with a pane of glass.

The pane of glass combined with the polyurethane film is immersed in a 10% solution of a methacrylic resin having a hydroxyl number $I_{OH}$ of 50 in methyl ethyl ketone, with a dry extract of 60% in a mixture of 4 parts of xylene and 1 part of butyl acetate, with the solution also containing an initiator for the photochemical polymerization of the methacrylic resin.

The soaking time is 1 minute, after which the pane is rinsed with methyl ethyl ketone and the assembly is dried for 10 min at 60° C. The face of the pane carrying the polyurethane film is then irradiated for 90 seconds with a 400-watt UV lamp.

EXAMPLE 13

The procedure of Example 1 is repeated except that the copolymer having ethylene oxide and propylene oxide segments of a molecular weight of 1900 is replaced by a copolymer of the same family but having a molecular weight of 2200, which contains 47% by weight of ethylene oxide (for example, the product marketed under the name SYNPERONIC L44 by the ICI Co.).

EXAMPLE 14

The procedure of Example 1 is repeated except that the copolymer having ethylene oxide and propylene oxide segments is replaced by a difunctional sulfonated polyetherpolyol that has ethylene oxide segments and molecular weight close to 1000 the polyetherpolyol containing 100% by weight of ethylene oxide segments in the chain also containing $SO_3^-Na^+$ terminal groups.

CONTROL EXAMPLE 1

The procedure of Example 1 is repeated except that the reaction mixture of components is cast directly on the casting substrate coated with the release agent, without having previously formed an acrylic coating.

CONTROL EXAMPLE 2

The procedure of Example 1 is repeated except that the NCO/OH ratio used is 1.

CONTROL EXAMPLE 3

The procedure of Example 1 is repeated except that an acrylic coating 20 microns thick is formed on the casting substrate.

CONTROL EXAMPLE 4

The procedure of Example 1 is repeated except that the copolymer having ethylene oxide and propylene oxide segments is replaced by another copolymer having a molecular weight of 1630 and containing only 25% by weight of ethylene oxide segments.

The polyurethan films obtained according to the examples are subjected to abrasion tests. One of the abrasion tests is a wear test generally used to measure the wear strength of paper.

A sample 12 cm in diameter obtained according to the examples is placed on a rotating plate, and a cotton fabric is applied to the face of the sample to be tested, i.e., the face treated by the acrylic or isocyanate coating, with a weight applied of 1 kg. The sample is rotated for 1000 turns. It is then removed from the apparatus, and its surface condition and transparency are observed.

Another wear test showing the abrasion resistance of the film with solvent consists of soaking the sample with cyclohexanone and subjecting it to 500 turns as in the above test.

The results of these abrasion tests are shown in the table below. The appearance of the sample is noted:

good: when the transparency of the sample has not been affected by the test;

medium: when slight cloudiness is observed;

poor: when the sample is scratched and has lost its transparency.

| EXAMPLES | APPEARANCE OF THE SAMPLE AFTER 1000 DRY TURNS | APPEARANCE OF THE SAMPLE AFTER 500 TURNS IN THE PRESENCE OF CYCLOHEXANONE |
| --- | --- | --- |
| 1 | GOOD | GOOD |
| 2 | GOOD | GOOD |
| 3 | GOOD | GOOD |
| 4 | GOOD | GOOD |
| 5 | GOOD | GOOD |
| 6 | GOOD | GOOD |
| 7 | GOOD | GOOD |
| 8 | GOOD | GOOD |
| 9 | GOOD | GOOD |

| EXAMPLES | APPEARANCE OF THE SAMPLE AFTER 1000 DRY TURNS | APPEARANCE OF THE SAMPLE AFTER 500 TURNS IN THE PRESENCE OF CYCLOHEXANONE |
| --- | --- | --- |
| 10 | GOOD | GOOD |
| 11 | GOOD | GOOD |
| 12 | MEDIUM | MEDIUM |
| 13 | GOOD | GOOD |
| 14 | GOOD | GOOD |
| CONTROL 1 | POOR | MEDIUM |
| CONTROL 2 | GOOD | GOOD |
| CONTROL 3 | POOR | POOR |
| CONTROL 4 | GOOD | GOOD |

To evaluate the antifogging effect, a procedure is used as described in the standard DIN 4648, section 8, except that the temperature of the water is adjusted to 40° C. thermostatically. The measure of the condensation behavior used is the time before condensation on the sample first becomes perceptible to the naked eye (time to appearance of fogging). With known polyurethane coating films in general, condensation is first perceptible immediately after introducing the sample into the measuring apparatus.

The time for appearance of fogging is longer than 5 minutes for all of the examples pursuant to the invention (1 to 14). The appearance of fogging is faster for Control Example 4.

The mechanical properties of the polyurethane film obtained in Examples 1 to 14 ar adequate to impart energy-absorbing properties to it.

The results of the tests show that the polyurethane film obtained by reactive casting on a substrate previously coated with an acrylic coating or a coating based on isocyanate having a functionality greater than 2, of small thickness, shows very good abrasion resistance and antifogging properties.

The acrylic coating or the coating based on an isocyanate having a functionality greater than 2 of the present invention has a thickness of less than 20 microns, preferably less than 10 microns.

The mechanical properties of the film of Control Example 2 are inadequate.

When the coating is too thick, the abrasion resistance, to the contrary, is reduced relative to the resistance shown by an untreated film.

When the coating operation is done by soaking the already-polymerized plastic film in an acrylic bath, the improvement of abrasion resistance is less, and deterioration of the optical quality is observed.

The polyurethane film of the invention, combined or not with one or more layers of plastic substance, is beneficially used as an external film for laminated glass comprising a glass or plastic substrate, with the "treated" face of the film being oriented toward the outside of the pane.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A process of producing a transparent polyurethane film of high optical quality which is a useful component of safety glass as an external film, having energy-absorbing properties and whose scratch-resistance and abrasion resistance is improved by surface treatment, which comprises:
    applying to a substrate a surface treatment compound of an acrylic derivative or isocyanate having a functionality greater than 2 in the form of a thin coating;
    thereafter applying onto the surface of said thin coating, for the formation of a polyurethane film by reactive casting or reactive spraying, a reaction mixture of an isocyanate component and a polyol component containing at least one long difunctional polyol having a molecular weight between 500 and 10,000, containing at least partial ethylene oxide segments, with the percentage by weight of ethylene oxide segments relative to the total weight of the polyurethane being greater than 20%, at least one short diol as chain extender, with the ratio of free NCO groups of the isocyanate component to free OH groups of the polyol component ranging from 1.5 to 2;
    polymerizing the materials of the applied reaction mixture and the surface treatment compound; and
    removing the polymerized polyurethane layer and the attached polymerized surface material from said substrate.

2. The process of claim 1, wherein said substrate is initially coated with a release agent before being coated with said treatment compound.

3. A process of producing a transparent polyurethane film of high optical quality which is a useful component of safety glass as an external film, having energy-absorbing properties and whose scratch-resistance and abrasion resistance is improved by surface treatment, which comprises:
    applying onto an exposed surface of a substrate, by reactive casting or reactive spraying, a reaction mixture of an isocyanate component and a polyol component containing at least one long difunctional polyol having a molecular weight between 500 and 10,000, containing at least partial ethylene oxide segments, with the percentage by weight of ethylene oxide segments relative to the total weight of the polyurethane being greater than 20%, at least one short diol as chain extender, with the ratio of free NCO groups of the isocyanate component to free OH groups of the polyol component ranging from 1.5 to 2;
    polymerizing the materials of the applied reaction mixture;
    removing the polymerized polyurethane layer from said substrate;
    combining the polymerized layer with a pane of glass or plastic material;
    contacting the exposed surface of the polymerized polyurethane layer intended to face toward the outside of said safety glass with a surface treatment compound of an acrylic derivative or isocyanate having a functionality greater than 2; and
    polymerizing the suface treatment compound.

4. The process of claim 3, wherein the contact of the polyurethane film surface with the surface treatment coumpound is conducted by a soaking operation.

5. The process of claim 1 or 3, wherein the long polyol having ethylene oxide segments has a molecular weight between 1000 and 3000.

6. The process of claim 1, wherein NCO/OH ratio of the reactive mixture ranges from 1.7 to 1.9.

7. The process of claim 1 or 3, wherein the long polyol with ethylene oxide segments is a copolymer having ethylene oxide segments and propylene oxide segments.

8. The process of claim 11 or 3 wherein the content of ethylene oxide segments in the long polyol is greater than 40% by weight.

9. The process of claim 8, wherein the long polyol is a sulfonated polyetherpolyol.

10. The process of claim 3, wherein the polyol having a functionality greater than 2 is a hydrophilic triol.

11. The process of claim 1 or 3, wherein the surface treatment compound is selected from the group consisting of acrylate monomer and methacrylate monomer, polyacrylates and polymethacrylates of low molecular weight, acrylic polymers having free hydroxyl groups, isocyanates having a functionality greater than 2, isocyanate biurets, isocyanurates, and trimeric triisocyanates.

12. The process of claim 11, wherein the triisocyanate is selected from the group consisting of biuret, the isocyanurate, and the trimer of hexamethylenediisocyanate.

13. The process of claim 11, wherein said thickness is less than 10 microns.

14. The process of claim 1 or 3, wherein the coated film of the treatment compound has a thickness less than 20 microns.

* * * * *